Patented Oct. 9, 1928.

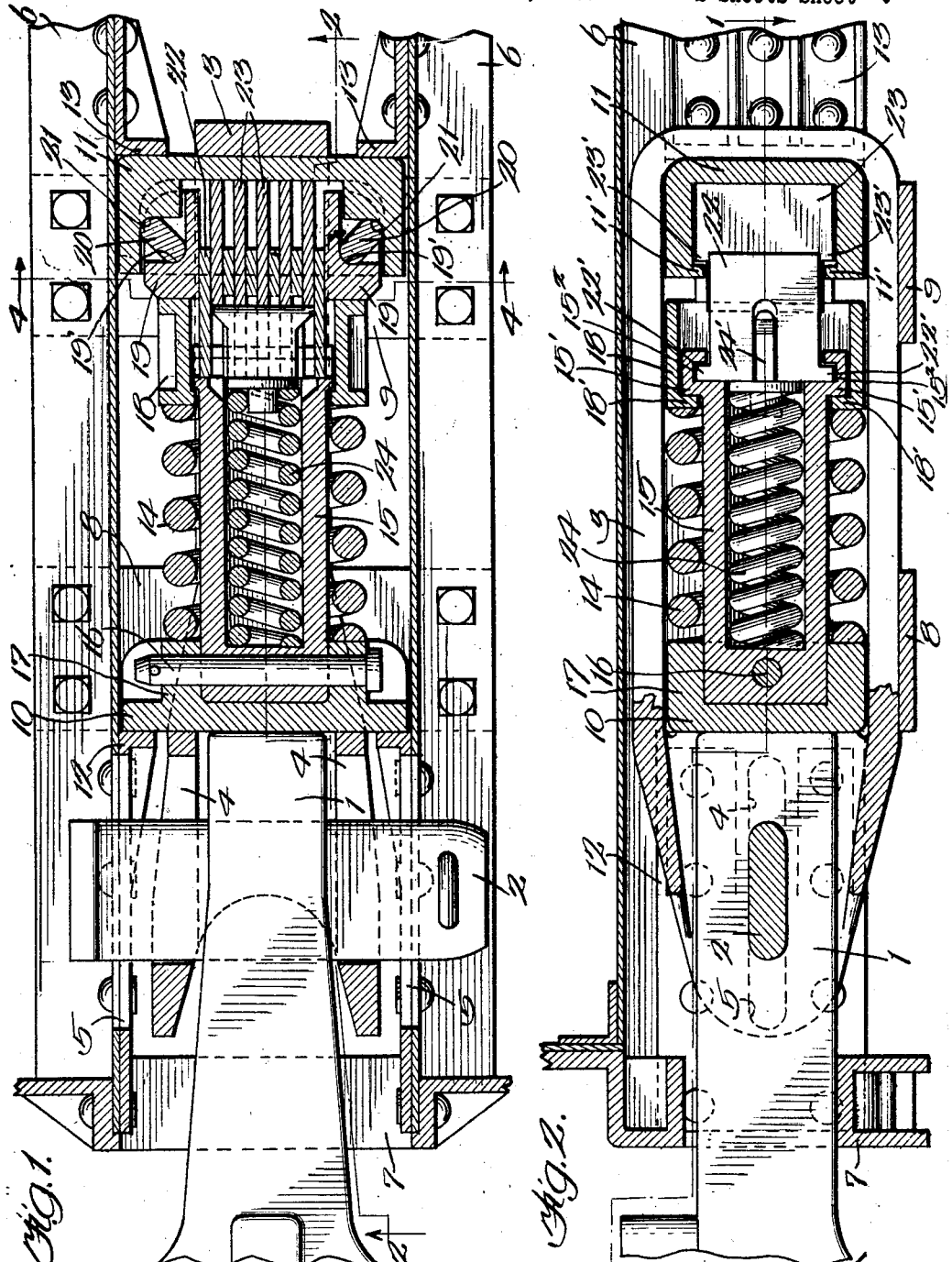

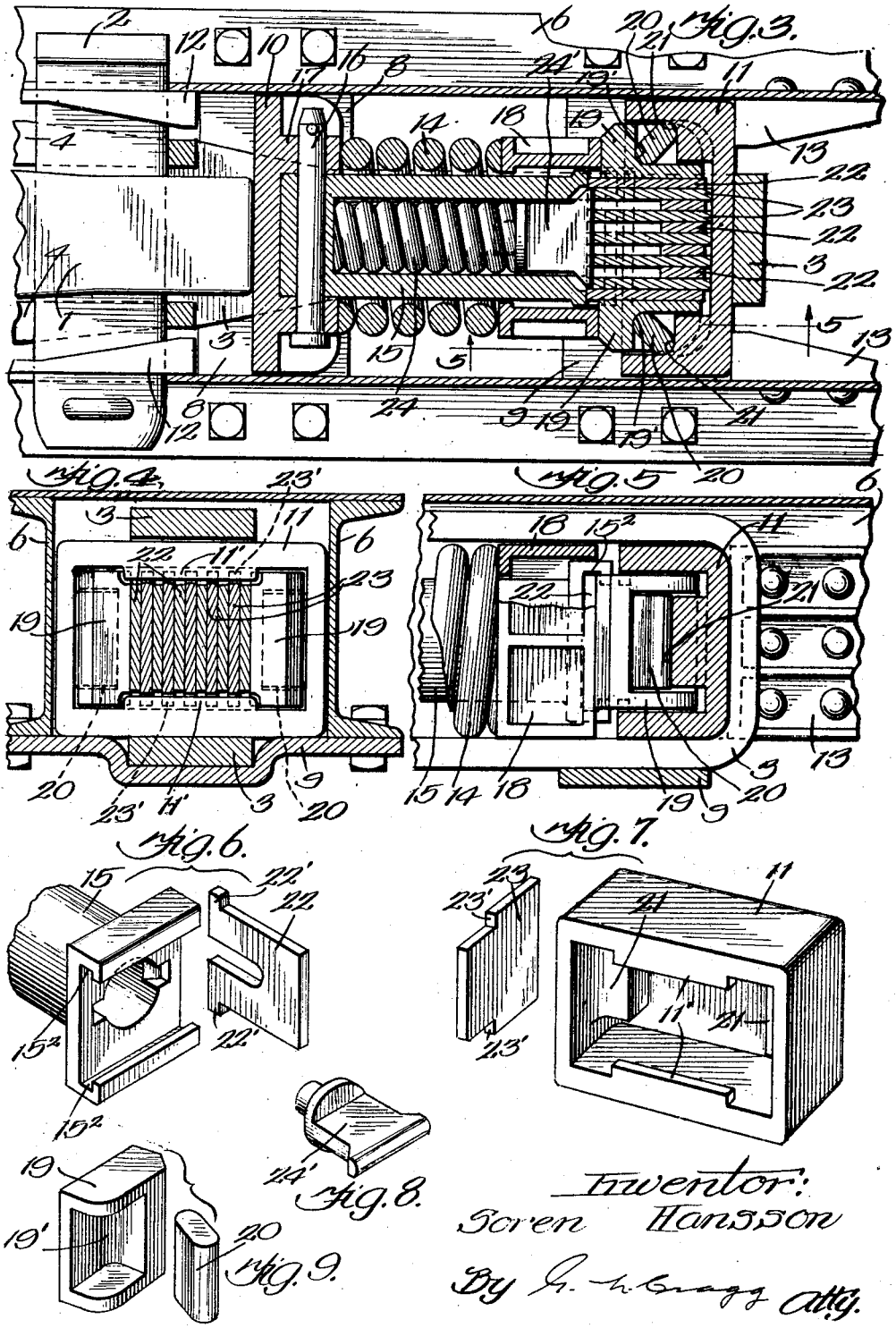

1,686,612

UNITED STATES PATENT OFFICE.

SOREN HANSSON, OF BUTLER, PENNSYLVANIA.

FRICTION DRAFT GEAR.

Application filed December 17, 1925. Serial No. 76,081.

My invention relates to friction draft gears employed in connecting railway cars. The invention is of particular service when employed in connection with those draft gears having intercalated friction producing plates, though the invention is not to be thus limited.

The invention has a number of advantageous characteristics among which are, the provision of ample release force so functioning as to avoid sticking whenever the closing movement of the gear ceases and the reverse movement begins; the provision of cooperating friction elements and means to transmit draft strains to said elements, preferably through the intermediation of an application spring in such manner that the frictional resistance of said members preferably will vary in direct proportion to the force exerted by said spring; the employment of a release spring operating upon a portion of the friction producing elements in the unclosing movement of the gear and the employment of a member operated by the application spring which serves to effect the initial releasing action intended to be effected by the release spring, in case the release spring does not initially function, the invention, however, not being limited to the employment of the release spring when this application operated member is employed to effect releasing action; such an arrangement of one or more of the friction producing elements as to enable it to function as a motion limiting means to prevent the gear from operating beyond a predetermined range so that it may receive excessive shocks without becoming injured; the provision of two friction producing members or two sets of friction producing members, one directly subject to buffing strains and the other directly to pulling strains in association with an application spring for effecting increasing friction producing pressure, as the draft strain increases, upon these members or sets of members to then cause increasing friction between the members; and the provision of means for limiting the extent to which the application spring may expand and maintaining it under minimum compression when the gear is normal or idle so that the spring will instantly function when it is to operate.

The invention has other useful features and will be more fully described in connection with the accompanying drawings in which Fig. 1 is a sectional plan view of my improved gear, as it is preferably constructed, taken on line 1—1 of Fig. 2, this figure showing the gear in its idle or normal condition; Fig. 2 is a sectional elevation taken on line 2—2 of Fig. 1; Fig. 3 is a sectional plan view taken similarly to Fig. 1, but showing only a part of the structure appearing in Fig. 1 and illustrating the gear in action; Fig. 4 is a sectional view on line 4—4 of Fig. 1; Fig. 5 is a sectional view on line 5—5 of Fig. 3; Fig. 6 is a perspective view illustrating a portion of the tubular extension or column constituting a part of the follower and one of the several friction producing plates that are assembled with this follower extension to be caused to travel when this follower travels; Fig. 7 is a perspective view illustrating one of the additional friction producing plates which are interleaved or intercalated with the other friction producing plates, this figure also showing the other follower that is in the form of a box which receives these additional friction producing plates; Fig. 8 is a perspective view illustrating the motion transmitting member that is interposed between a release spring and the friction producing plates of which one is illustrated in Fig. 7; and Fig. 9 is a perspective view illustrating one of the two blocks between which the intercalated plates are disposed and the toggle lever pertaining to this block to exert friction producing pressure between the intercalated plates.

The draft gear of my invention may include any suitable form of coupler and yoke and may be associated with any suitable form of draft sills.

The coupler stem 1, illustrated in the drawings, is provided with a key 2 extending transversely therethrough and snugly fitting the same to travel therewith. I have illustrated a yoke which is inclusive of a looped strap 3 arranged in a vertical plane and having a forked outer end in the sides of which horizontal slots 4 are formed, these slots being longer than the width of the key 2 that passes therethrough, this key pulling upon the yoke when the gear is subject to pulling strains and moving inwardly in the slots 4 when the gear is subject to buffing strains. The key 2 passes through horizontal slots 5 formed in the draft or center sills 6, the key occupying a middle position in these slots when the draft gear is normal or idle and being moved outwardly in these slots when the gear is subject to pulling strain and inwardly in these slots when the gear is subject to pushing or buffing strain. Bridge pieces 7, 8 and 9 underlie the draft or center sills and are in supporting relation to the coupler stem and yoke. The inner end of the stem and the outer end of the yoke are supported by means of the key 2 and the bottom sides of the slots 5 on which this key slides. The yoke surrounds an outer follower 10 and an inner follower 11. The outward movement of the outer follower is limited by draft lugs 12 secured upon the inner faces of the center sills and the inner movement of the inner follower is limited by draft lugs 13, similarly secured. When the gear is subject to pushing or buffing strains, the outer follower 10 is moved inwardly by the inner end of the coupler stem and the inner follower 11 is held from inward movement by the draft lugs 13. When the gear is subject to pulling strains, the inner follower 11 is moved outwardly by the rear end of the coupler yoke and the outer follower 10 is held against outward movement by the draft lugs 12. The movements of the followers longitudinal of the gear are resisted by the mechanism of my invention.

As illustrated, this mechanism is inclusive of a heavy application spring 14 which surrounds a hollow column 15 constituting an inward extension of the outer follower with which follower said column is assembled by means of a pin 16 which passes through the outer end of the column and through a circular wall 17 projecting inwardly from the outer follower. The outer end of the spring 14 abuts against the circular wall 17 and the inner end of this spring abuts against a frame 18 which surrounds the inner end of the column and is movable longitudinally thereof. The frame 18 constitutes a member through which pressure of the spring 14 is transmitted to blocks 19 that are moved inwardly by the direct action of the spring and are moved transversely of the gear by means of toggle levers 20 which are fulcrumed in the fulcrum seats 21 formed within the follower 11, this follower being desirably in the form of a box having an open outer end. The ends of the levers opposite their fulcra are received in seats provided in the side recesses 19' of the blocks 19. The application spring 14 not only causes inward longitudinal movement of the blocks 19 by its direct action but also causes approaching transverse movements of the blocks due to the action of the toggle levers on the blocks, these levers not only operating the blocks but being operated by the blocks as well as the blocks move inwardly.

When the gear is released, the levers are idle, permitting the blocks to move transversely apart whereupon the interleaved or intercalated friction producing plates 22 between them are released as will appear. Means are afforded for limiting the expansion of the spring 14 when the gear is idle, so that it may be instantly operative to transmit draft strains to the intercalated plates. The means for limiting the expansion of the spring 14 resides in the inwardly extending shoulders 18' upon the outer end of the frame 18 and the shoulders 15' at the inner end of the column 15, these shoulders being forced into engagement by the spring 14 when the gear is idle and the blocks 19 are to be permitted to assume their outermost transverse positions, these interengaging shoulders receiving a predetermined minimum pressure of the spring to maintain it normally under minimum compression.

The plates 22 are positioned by and moved with the outer follower 10, being preferably assembled with the extension 15 of this follower by means of ears 22' upon these plates that enter grooves $15^2$ in the inner end of the follower extension 15. The plates 23 are assembled with the follower 11 and are positioned thereby, these plates having outwardly facing shoulders 23' that are engaged by the inwardly facing shoulders 11' upon the follower 11. When the gear is under buffing strain the plates 23 engage the bottom of the box-like follower 11 and, as this follower is then held by the lugs 13, these plates do not travel. The plates 22, however, are then pushed inwardly by the inner end of the column 15 and rub along the adjacent faces of the plates 23. When the gear is subject to pulling strain, the plates 22 are held from outward movement because the follower 10 is then held by the draft lugs 12, the plates 23 then moving outwardly and rub along the adjacent faces of the plates 22. The extent to which either follower may move toward the other is limited by the engagement of the inner ends of the plates 22 and 23 with the bottom of the box-like follower 11 and by engagement of the outer ends of these plates with the column extension 15 of the follower 10. These plates thus serve to directly limit the extent to which the followers may approach one another.

When either follower is moved toward the other, the blocks 19 operate the levers 20 and these levers press these blocks inwardly to cause friction producing pressure that increases as the draft strain increases. When the gear is relieved of draft strain, the blocks 19 are permitted to move apart to the extent defined by the spring 14 when held under its minimum and light degree of compression by the interengaged shoulders 15' and 18'. The followers are then preferably placed nearly in their most spaced apart relation, the spring operating, for this purpose, through the frame 18, the blocks 19, and the levers 20, the spring 14 maintaining the followers in this relation, until the release spring completely operates, due to the minimum degree of compression under which the spring is then held.

As each block is moved inwardly in response to draft strains, it is pressed upon the plate 22 adjacent to it, these plates are consequently pressed upon the plates 23 respectively adjacent to them, these plates 23 are consequently pressed against the plates 22 upon the inner sides thereof, and so on. The plates operated upon by each block 19 thus are brought into increasing frictional engagement as the draft strain increases so that the motion retarding friction is gradually built up to correspond with the degree of draft strain as it increases. This growing friction between the plates 22 and 23 increases in direct proportion to the increase in the power of the spring 14 resulting from its increasing compression as the draft strain increases.

The release spring 24 is bottomed in the column 15 to be subject to draft strains. When the gear is relieved of draft strain, the release spring presses inwardly upon the plates 23, through the intermediation of a plunger 24', in a releasing direction. The motion retarding friction is reduced, gradually, as the draft strain is reduced, by gradual disengagement of the plates 22, 23, so that the gear will not stick when it is opened and will be in readiness again to function immediately when the draft strain is next applied thereto. While the intercalated plates and parts in association therewith are shown as being at the inner end of the gear, the invention is not to be thus limited.

When draft strains cease, release spring 24 alone operates, if the closing movement of the gear was sufficiently small, or the application spring 14 and the release spring both initially cooperate, if the closing movement was sufficiently great, to effect restoration of the intercalated plates. The application spring 14, having thus functioned, ceases to take further part in restoring the friction plates due to the engagement of shoulders 18' on frame 18 with shoulders 15' on the column 15, these shoulders maintaining spring 14 under a minimum degree of compression. The release spring 24, however, effects or continues the restoring movement of the plates beyond the restoring range of the application spring until the followers 10 and 11 are fully engaged with their respective draft lugs. It is thus the release spring 24, instead of the application spring 14, that maintains both followers fully in engagement with their draft lugs when the gear is idle, spring 14 being then held under a minimum degree of compression, as stated, without affecting the friction producing mechanism. The application spring 14 thus preferably has no appreciable effect when the gear is initially subject to draft strain, the spring 24 then initially taking the shock which is subsequently also taken, if sufficiently great, by the application spring and friction mechanism. The gear may thus initially operate substantially as a spring gear and subsequently as a friction gear.

Changes may be made without departing from the invention.

Having thus described my invention, I claim:—

1. A friction draft gear including two members cooperating to produce friction, one subject to buffing action of the gear and the other to pulling action of the gear; two blocks between which said friction producing members are disposed, said blocks being movable toward each other to press each of said friction producing members against the other; two toggle levers, one individual to each block; fulcrum supports for said levers; an application spring, means whereby said spring is operable by draft strains to move said blocks and levers to cause said blocks to press said friction producing members together; and a release spring, also subject to draft strains, pressing upon one of the friction producing members in a releasing direction.

2. A friction draft gear including two members cooperating to produce friction, one subject to buffing action of the gear and the other to pulling action of the gear; two blocks between which said friction producing members are disposed and movable toward each other to press each of said friction producing members against the other; two toggle levers, each block having a lever individual thereto and operating thereon; a follower supporting the fulcra of said levers; an application spring, subject to draft strains, pressing against said blocks and moving the blocks against said levers; and a release spring, also subject to draft strains, pressing upon one of the friction producing members in a releasing direction.

3. A friction draft gear including two members cooperating to produce friction, one subject to buffing strains and the other subject to pulling strains; an application spring transmitting draft strains to said members to produce friction; a hollow column transmitting draft strains to one of said members; and a release spring operating upon said members in a releasing direction and subject to draft strains, one of said springs being upon the exterior of said column and the other upon the interior of the column.

4. A draft gear including an inner follower, an outer follower, stop means limiting inward movement of the inner follower and outward movement of the outer follower, a yoke surrounding said followers, a coupler stem connected with said yoke for limited longitudinal movement with respect thereto, the inner end of said coupler stem being in abutting relation to said outer follower, a set of intercalated friction plates some of which are arranged to be moved outwardly by said inner follower and others of which are arranged to be moved inwardly by said outer follower, a pair of blocks one at each side of said set of plates, a toggle mechanism for forcing said plates into frictional engagement with one another consisting of a pair of levers each of which is fulcrumed at one end upon one of said followers, the other end of one of said levers being fulcrumed upon one of said blocks and the other end of the other of said levers being fulcrumed upon the other of said blocks, and an application spring between said blocks and the other of said followers.

5. A draft gear including an inner follower, an outer follower, means whereby said inner follower is moved towards said outer follower when the gear is subjected to pulling strains and whereby said outer follower is moved towards said inner follower when the gear is subjected to buffing strains, a set of intercalated friction plates between said followers, some of said plates being arranged to be moved inwardly by said outer follower and other of said plates being arranged to be moved outwardly by said inner follower, a toggle mechanism between said plates and one of said followers operable by movement of either of said followers towards the other to force said plates into frictional engagement with one another, an application spring between said toggle mechanism and the other of said followers through which movement of either follower is transmitted to said toggle mechanism, and means independent of said application spring to release said plates from frictional engagement with one another when compression strains on the gear are removed.

6. A draft gear including an inner follower, an outer follower, means whereby said inner follower is moved towards said outer follower when the gear is subjected to pulling strains and whereby said outer follower is moved towards said inner follower when the gear is subjected to buffing strains, a set of intercalated friction plates between said followers, some of said plates being arranged to be moved inwardly by said outer follower and other of said plates being arranged to be moved outwardly by said inner follower, mechanism including an application spring between said followers and said plates operable by movement of either of said followers towards the other to force said plates into frictional engagement with one another, a hollow column extending from one of said followers towards the other to which one set of said plates is connected, and a release spring within said column constantly exerting a force on the plates of the other set tending to move them in a direction to release the plates of the two sets from frictional engagement with one another.

7. A draft gear including an inner follower, an outer follower, means whereby said inner follower is moved towards said outer follower when the gear is subjected to pulling strains and whereby said outer follower is moved towards said inner follower when the gear is subjected to buffing strains, a column extending from one of said followers towards the other, a pair of cooperating friction members, one of which is arranged to be moved outwardly by said inner follower and the other of which is arranged to be moved inwardly by said outer follower, mechanism between said followers and said friction members operable by movement of either follower towards the other to force said friction members into frictional engagement with one another, said mechanism including an application spring surrounding said column and bearing at its ends, respectively, against the follower carrying said column and a member that is slidable along said column, whereby it acts in compression to transmit draft strains to said friction members, and means limiting movement of said slidable member along said column by said application spring when same acts expansively upon release of compression strains upon the gear whereby said spring is maintained slightly compressed when the gear is idle.

8. A draft gear including a pair of followers, means whereby one of said followers is moved towards the other when the gear is subjected to compressive strains, a set of friction plates mounted to move with one of said followers, a second set of friction plates mounted to move with the other follower, the plates of said sets being arranged in intercalated relation, and a pair of tumbler elements operating in the manner of a toggle to force said plates into frictional engagement with one another to resist relative movement of the followers towards each other when the gear is subjected to compressive strains, said plates being arranged between said tumbler elements.

In witness whereof, I hereunto subscribe my name.

SOREN HANSSON.